(12) United States Patent
King et al.

(10) Patent No.: US 7,190,133 B2
(45) Date of Patent: Mar. 13, 2007

(54) ENERGY STORAGE SYSTEM AND METHOD FOR HYBRID PROPULSION

(75) Inventors: Robert Dean King, Schenectady, NY (US); Dongwoo Song, Latham, NY (US); Lembit Salasoo, Schenectady, NY (US); Ajith Kuttannair Kumar, Erie, PA (US)

(73) Assignee: General Electric Company, Niskayuna, NY (US)

( * ) Notice: Subject to any disclaimer, the term of this patent is extended or adjusted under 35 U.S.C. 154(b) by 132 days.

(21) Appl. No.: 10/878,804

(22) Filed: Jun. 28, 2004

(65) Prior Publication Data

US 2005/0285554 A1    Dec. 29, 2005

(51) Int. Cl.
*B61C 3/00* (2006.01)
*B60K 6/00* (2006.01)
*H02P 3/14* (2006.01)

(52) U.S. Cl. ............. 318/375; 318/376; 318/371; 105/34.2; 105/35; 105/73; 105/61; 105/26.05; 180/65.2; 180/65.3; 180/165; 320/101; 320/104

(58) Field of Classification Search ............... None
See application file for complete search history.

(56) References Cited

U.S. PATENT DOCUMENTS

| | | | |
|---|---|---|---|
| 3,736,482 A | | 5/1973 | Brusaglino |
| 4,124,812 A | * | 11/1978 | Naito et al. .................. 318/371 |
| 4,479,080 A | * | 10/1984 | Lambert ....................... 318/373 |
| 4,597,463 A | * | 7/1986 | Barnard ........................ 180/165 |
| 4,675,585 A | | 6/1987 | Krueger et al. |
| 5,291,960 A | * | 3/1994 | Brandenburg et al. ...... 180/65.2 |
| 5,563,479 A | | 10/1996 | Suzuki |
| 5,589,743 A | | 12/1996 | King ............................ 318/139 |
| 5,704,440 A | * | 1/1998 | Urban et al. ................. 180/65.2 |
| 5,710,699 A | * | 1/1998 | King et al. ..................... 363/132 |
| 5,998,960 A | * | 12/1999 | Yamada et al. ................ 320/104 |
| 5,999,864 A | * | 12/1999 | Thiel et al. .................... 701/22 |
| 6,308,639 B1 | * | 10/2001 | Donnelly et al. ............ 105/50 |
| 6,378,636 B1 | * | 4/2002 | Worrel ........................ 180/65.2 |
| 6,426,608 B2 | * | 7/2002 | Amano et al. ............... 320/163 |

(Continued)

FOREIGN PATENT DOCUMENTS

DE    102 30 384 A1    1/2004

(Continued)

OTHER PUBLICATIONS

Caratozzolo, P. et al., "Energy Management Strategies for Hybrid Electric Vehicles", Electric Machines and Drives Conference, 2003, IEMDC'03. IEEE International Jun. 1-4, 2003, Piscataway, NJ, USA, IEEE, vol. 1, Jun. 1, 2003, pp. 241-248.

*Primary Examiner*—Lincoln Donovan
*Assistant Examiner*—Eduardo Colon Santana
(74) *Attorney, Agent, or Firm*—Fletcher Yoder

(57) ABSTRACT

A hybrid propulsion system. The system comprises one or more hybrid propulsion traction drives having an electric motor operable to produce mechanical power for propulsion. A hybrid propulsion traction drive is operable to receive power from an on-board power generation system. The electric motor is operable to receive power from an energy storage unit and operable to supply power to the energy storage unit. The energy storage unit may be coupled to the electric motor via a switch.

6 Claims, 6 Drawing Sheets

U.S. PATENT DOCUMENTS

| | | | |
|---|---|---|---|
| 6,441,581 B1 | 8/2002 | King et al. | 320/101 |
| 6,462,976 B1* | 10/2002 | Olejniczak et al. | 363/147 |
| 6,612,245 B2* | 9/2003 | Kumar et al. | 105/26.05 |
| 6,612,246 B2* | 9/2003 | Kumar | 105/34.2 |
| 6,659,571 B2* | 12/2003 | Herrmann | 303/152 |
| 6,683,389 B2* | 1/2004 | Geis | 290/40 C |
| 2002/0070556 A1 | 6/2002 | Patel et al. | |
| 2003/0151387 A1* | 8/2003 | Kumar | 320/104 |
| 2004/0056633 A1* | 3/2004 | Sugiura et al. | 320/101 |
| 2004/0102109 A1* | 5/2004 | Cratty et al. | 440/113 |
| 2005/0048335 A1* | 3/2005 | Fields et al. | 429/22 |
| 2005/0206331 A1* | 9/2005 | Donnelly | 318/52 |

FOREIGN PATENT DOCUMENTS

| | | |
|---|---|---|
| EP | 0 972 668 A2 | 1/2000 |
| JP | 58 006002 A | 1/1983 |

* cited by examiner

ENERGY STORAGE SYSTEM AND METHOD FOR HYBRID PROPULSION

BACKGROUND

The invention relates generally to hybrid propulsion systems, and in particular to a system and method for distributed energy storage in heavy duty hybrid propulsion applications.

Some vehicles use electric traction motors to propel the vehicle. Typically, the electric traction motors are connected to a link, such as a bus, that provides the motors with power. One or more on-board alternators may be used to provide the power to the link. In certain operating conditions, such as when the vehicle is decelerating or is maintaining speed on a downhill grade, the back-emf produced by the electric motors is greater than the voltage provided by the engine-driven alternator. Under such conditions, the electric traction motors cease acting as motors and become alternators. This process, known as dynamic braking, is a form of electric braking that is used to reduce wear on the mechanical brake system components on a vehicle. In the case where the vehicle is a locomotive, dynamic braking reduces brake wear on the locomotive and also all of the rail cars within the train, Typically, a resistor is used to dissipate the electric power as heat produced by the electric motor during dynamic braking.

Hybrid propulsion systems have been developed to recover some of the energy that is wasted as heat during dynamic braking. The recovery of this wasted energy is known as regenerative braking. Vehicles having heavy duty hybrid propulsion systems, such as buses, large trucks, mining vehicles, and locomotives, may require massive energy storage units, generally comprised of batteries, ultracapacitors, flywheel, or combinations of one more of these technologies. One example is a heavy haul hybrid locomotive propulsion system. In such applications, motive power is generally provided by a prime mover, such as a diesel engine, which is directly coupled to an alternator and an associated high power rectifier that converts the output of the alternator from an alternating current (AC) to a direct current (DC). The output of the rectifier is then coupled to a main DC link that may supply several motors with power. Typically, the energy storage unit is electrically connected to the main DC link through an electronic DC/DC converter that is controlled by an energy management system and associated vehicle system controls. The DC/DC converter provides a bi-directional DC-DC interface for the energy storage unit so that the energy storage unit is operable to supply power to the traction motors and to receive power from the traction motors during regenerative braking. The power from the traction motors is used to partially re-charge the energy storage unit. Thus, the energy that is normally dissipated in a grid resistor as heat during dynamic braking is recovered and used to partially re-charge the energy storage units. Later, the energy storage unit can be discharged to supply power to the traction motors. With proper system controls, the hybrid propulsion system can be used to provide vehicle acceleration with a reduced output power from the diesel engine, thus reducing the amount of fuel required for a given mission as compared to a conventional non-hybrid locomotive.

However, there are a number of problems associated with existing hybrid propulsion systems. For heavy duty vehicles, a bi-directional DC-DC energy storage interface typically is required due to the smaller power rating of the energy storage units compared to the power rating of the prime mover. However, the electronics required for the bi-directional DC/DC converter significantly increase the cost of the power electronics hardware. For example, during normal operation of a heavy duty vehicle, the voltage of the main DC link typically varies from approximately 250 V to 1,500 V. To reduce the cost of the DC/DC converter, the energy storage unit's output voltage is typically chosen to be either above or below the DC link during hybrid mode of operation. However, when the energy storage system in the hybrid propulsion system is required to operate both above and below the DC link voltage, an "H" bridge configuration is generally used in the DC/DC converter. However, the "H" bridge configuration requires at least twice the number of power electronic switches, significantly increasing cost of the DC/DC converter. A DC/DC converter of a high power rating also presents a potential reliability issue. Furthermore, due to the higher power requirements, the energy storage units of conventional hybrid propulsion systems require parallel operation of multiple smaller energy storage units. However, power sharing within the parallel energy storage units may be a problem during operation over a wide range of environmental temperature extremes. If power sharing is not adequately controlled, the life of the energy storage units may be reduced.

Still further, in conventional heavy duty hybrid vehicles, various electrical devices (such as electrical lights, fans, air compressor) are supplied power from the engine. This means that the engine is required to operate even when the vehicle is braking or running on a downhill grade to supply power to the electrical devices. This results in significantly reduced fuel economy.

Accordingly, techniques that decrease the cost and/or improve the energy efficiency of hybrid propulsion systems are desirable. More specifically, techniques that increase the amount of regenerative braking power produced by the hybrid propulsion systems of heavy duty vehicles that may be recovered are desirable.

BRIEF DESCRIPTION

In one aspect of the present technique, a propulsion system is provided that has one or more hybrid propulsion traction drives. The hybrid propulsion traction drives have an electric motor that is operable to produce mechanical power for propulsion and operable to generate electrical power during dynamic braking of the electric motor. A hybrid propulsion traction drive comprises an energy storage unit operable to supply power to the electric motor to produce mechanical power for propulsion and to receive electrical power from the electric motor during dynamic braking of the electric motor. A switch is provided which is operable to selectively couple the energy storage unit to the electric motor based on an operating parameter of the propulsion system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques provide a distributed energy storage system and method for use in hybrid propulsion systems. The techniques will be particularly advantageous in heavy duty vehicles, such as transit buses, trucks, locomotives, off-highway vehicles, etc.

Figure 1:
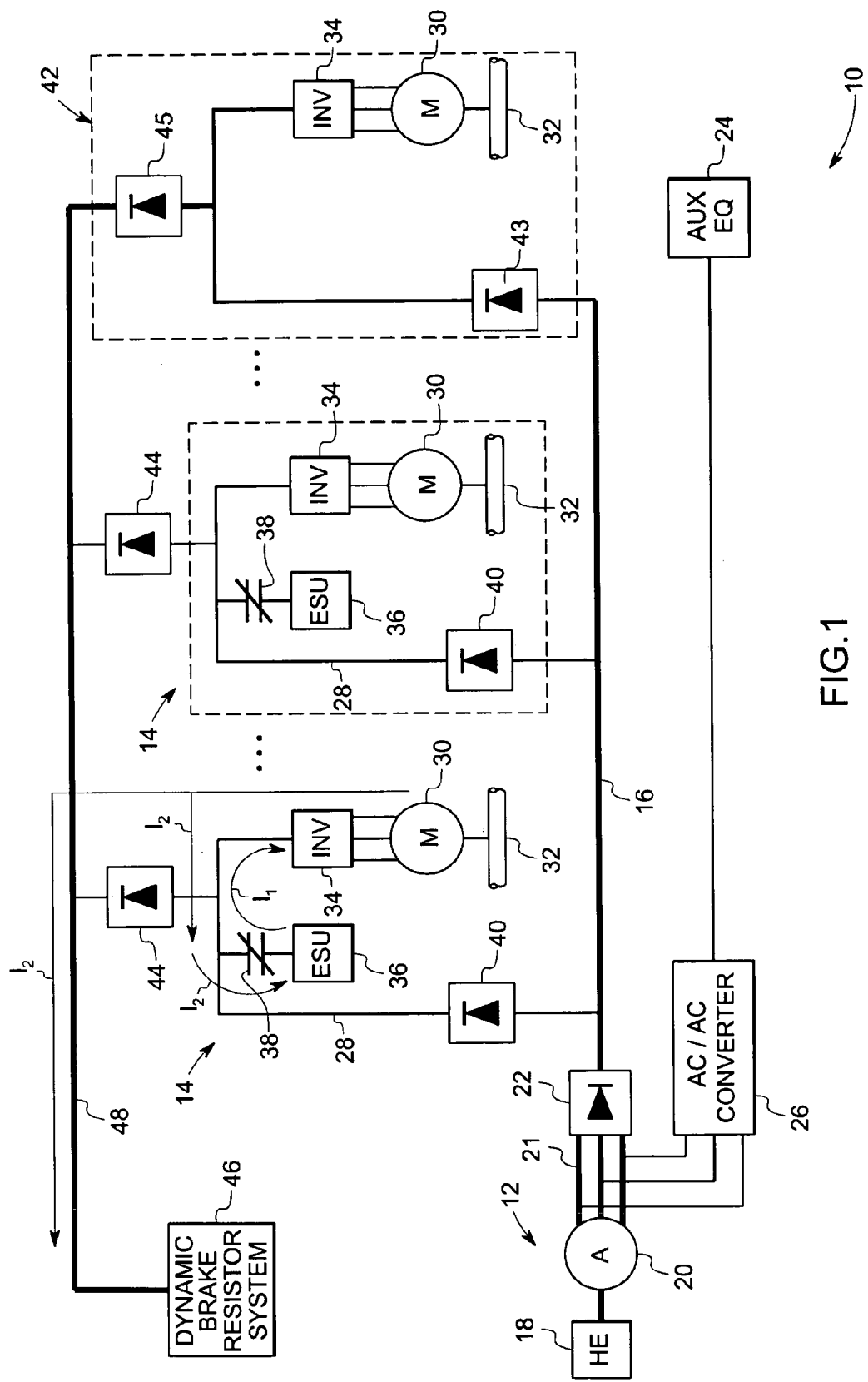
FIG. 1 is a schematic representation of a hybrid propulsion system illustrating power flow in low-power operation of the system, in accordance with an exemplary embodiment of the present technique.
Figure 2:
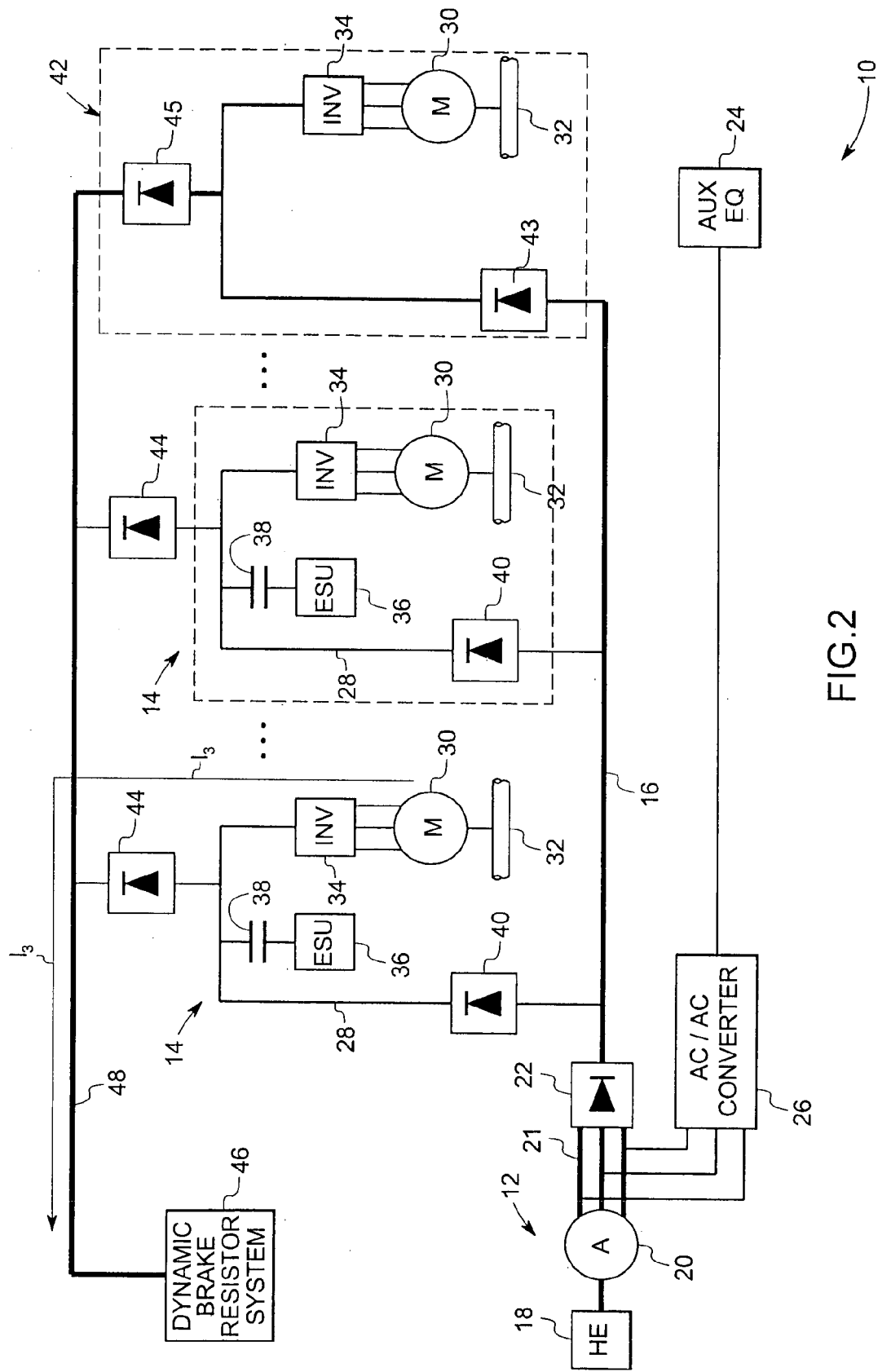
FIG. 2 is a schematic representation of the hybrid propulsion system of FIG. 1, illustrating power flow in a high-power operation of the system.

FIG. 1 and FIG. 2 illustrate a hybrid propulsion system 10 in accordance with aspects of the present techniques. The system 10 comprises an on-board power generation system 12, which is operable to supply power to at least one hybrid propulsion traction drive 14. The hybrid propulsion traction drives 14 are electrically coupled to the on-board power generation system 12 via a main direct current (DC) link 16. The term DC link is used herein to refer to positive and negative DC buses, which have portions at different voltage levels due to various components of the system 10. The illustrated on-board power generation system 12 utilizes a heat engine 18, such as a gasoline engine, a diesel engine, a gas turbine, etc. The heat engine 18 is drivingly coupled to an alternator 20, which transforms the mechanical output of the heat engine 18 into three-phase AC electrical power. The three-phase AC output of the alternator 20 is coupled to an AC bus or link 21. A rectifier 22 is used to convert the AC output of the alternator 20 into a DC output. The output of the rectifier 22 is coupled to the main DC link 16. In this embodiment, the alternator 20 is operable to supply power to auxiliary equipment 24 via an AC/AC converter 26. The auxiliary equipment 24 may include on-board electrical lighting, fans, air compressor, etc. However, one skilled in the art will appreciate that the auxiliary equipment 24 can be operated by a direct current provided by the main DC link 16.

Each of the illustrated hybrid prolusion traction drives 14 has a local DC link 28 that couples power to a traction motor 30 for driving a wheel axle set 32. In the illustrated embodiment, the traction motors 30 are AC motors. However, DC motors may also be used. An inverter 34 is provided to convert the DC on the local DC link 28 into AC. The hybrid propulsion traction drive 14 further comprises an energy storage unit (ESU) 36 coupled to the local DC link 28. The energy storage unit 36 in various embodiments may be a battery, an ultracapacitor, a flywheel, or some other type of energy storage device. In addition, a switch 38 is disposed between the energy storage unit 36 and the local DC link 28. The switch 38 may be a contact of a relay or any other type of electrical flow control device. In this embodiment, the switches 38 are closed automatically when the heat engine 18 is operated at a low power and opened when the heat engine 18 is operated at a higher power. However, other criteria may be used to control the operation of the switches 38, such as the voltage produced by the alternator 20. In a further embodiment, one or more hybrid propulsion traction drives 14 may comprise a plurality of electric motors 30, with associated inverters 34. In a still further embodiment, one or more hybrid propulsion traction drives may comprise a plurality of energy storage units 36.

The voltage on the local DC link 28 may vary greatly. A blocking diode 40 is disposed between the main DC link 16 and each local DC link 28 to prevent current from flowing from each local DC link 28 to the main DC link 16 when the voltage in the local DC link 28 is greater than the voltage on the main DC link 16. In accordance with the present techniques, a plurality of hybrid propulsion traction drives 14 may be coupled in parallel to the main DC link 16.

The system 10 may also comprise one or more conventional traction drives 42 that do not utilize hybrid propulsion. The number of hybrid propulsion traction drives 14 may vary from at least one to all of the traction drives used in a propulsion system. Similarly to the hybrid propulsion traction drives 14, the conventional traction drives 42 may be coupled to the main DC link by a blocking diode 43.

In normal operation, power is supplied to each of the hybrid propulsion traction drives 14 by the on-board power generation system 12 via the main DC link 16. However, during low power operations of the engine 18, such as when the vehicle is accelerating from a starting position, the voltage of the main DC link 16 is lower than the voltage of the energy storage units 36. For example, in a locomotive operated at a low power, the voltage across the main DC link 16 may be about 200 V, while the operating voltage of the energy storage unit 36 may be about 600 V. In such an operation, the switch 38 is closed, as shown in FIG. 1, and the energy storage unit 36 is coupled to the local DC link 28 to enable the energy storage unit 36 to supply power to the motor 30. Electrical current, represented by arrow $I_1$, flows from the energy storage unit 36 to the motor 30.

During a low power braking operation, the electric motors 30 operate as alternators. Each inverter 34 convert the AC output of a motor 30 into a DC output, represented by the arrow $I_2$, that is supplied to the local DC link 28 to partially charge the energy storage unit 36. When the energy storage unit 36 is fully charged or when the power produced by the traction motor 30 exceeds the ability of the energy storage units 36 to receive it, electric current from the motor 30 is directed through additional blocking diodes 44 and 45 to a dynamic brake resistor system 46 via a dynamic brake DC link 48. The dynamic brake resistor system 46 comprises a resistor having a generally high power rating used to dissipate the regenerative braking power produced by the traction motors 30 as heat.

Referring generally to FIG. 2, as the speed of the engine 18 increases, the output of the alternator 20 also increases. During such high speed and high power operation of the engine 18, the voltage of the main DC link may be greater than the voltage of the energy storage unit 36. For example, when operated at high power, the voltage across the main DC link 16 may be about 1400–1500 V, while the operating voltage of the energy storage unit 36 may be about 600 V. Power flow from the main DC link 16 to the energy storage unit 36 in a high power operation may lead to an overvoltage condition in the energy storage unit 36. Accordingly, the switch 38 is opened, thereby disconnecting the energy storage unit 36 from the local DC link 28. As a result, during high power braking operations, the regenerative power from the traction motors 30 is not directed to the energy storage unit 36. Rather, the regenerative power is directed to the dynamic brake resistor system 46 by the second blocking diode 44 via the dynamic braking link 48. The current flow from the motor 30 to the resistor system 46 is represented generally by arrow $I_3$.

The system 10 may be operated with different voltages on the local DC links 28. When one or more conventional traction drives 42 is present, either blocking diode 43 or blocking diode 45 is provided to block currents from circulating uncontrolled between different energy storage units 36 through the blocking diode 44 of one hybrid traction drive and the blocking diode 40 of another hybrid traction drive 14.

Preferably, blocking diode 43 is rated to conduct the maximum amount of current drawn that is drawn by the non-hybrid traction drive system 42. During low power operation of the engine 18, it may be possible to close one or more of the switches 38 and enable power to flow from one or more of the corresponding energy storage units 36 through the blocking diodes 44 to supply power to the non-hybrid traction system 42. However during dynamic braking, dynamic braking power generated by the non-hybrid traction drive system 42 will not be able to be used to charge any of the energy storage units 36 because it will be blocked by the non-hybrid DC link blocking diode 43.

A non-hybrid dynamic braking DC link blocking diode 45 is desirably rated to conduct the maximum dynamic braking current generated by the non-hybrid traction drive system 42. During dynamic braking operation of the vehicle it will be possible to close one or more of the switches 38 and enable dynamic braking power to flow from the non-hybrid traction system 42 to charge one or more of the corresponding energy storage units 36 through the blocking diodes 40. However during low power operation of the engine 18, it will not be possible to send power to the non-hybrid traction drive system 42 from any of the energy storage units 36 because it will be blocked by the non-hybrid dynamic braking DC link blocking diode 45.

The above illustrated embodiment of the present techniques thus eliminate the use of expensive DC-DC converters, and can be used advantageously in many applications, such as a switching yard locomotive, which generally operate at fairly low speeds and low power within a switchyard.

Figure 3:
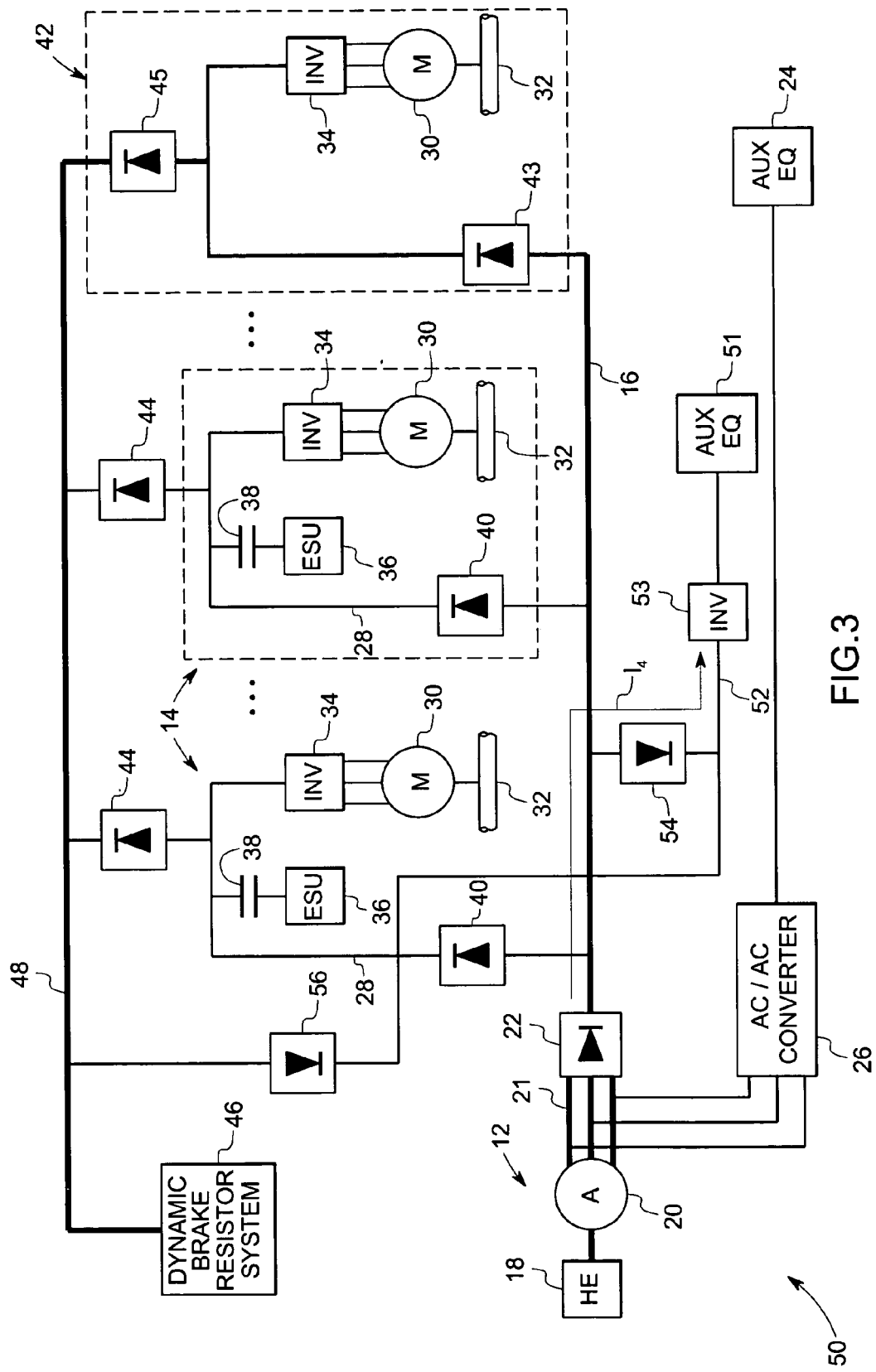
FIG. 3 is a schematic illustration of an alternative embodiment of a hybrid propulsion system, in accordance with an exemplary embodiment of the present technique.
Figure 4:
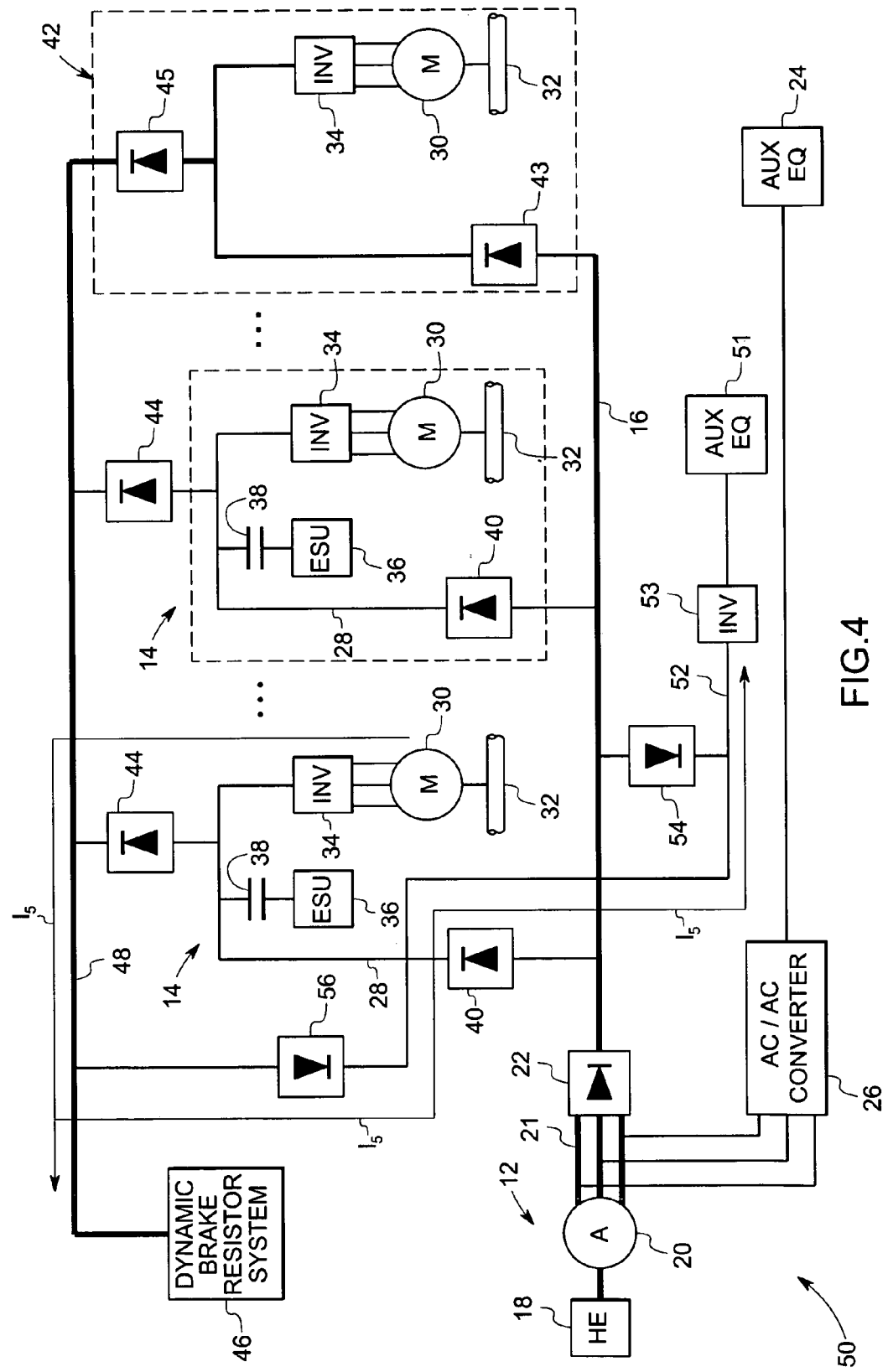
FIG. 4 is a schematic of the alternative embodiment of the system of FIG. 3, illustrating the supply of power to auxiliary equipment during a high-power braking operation.

Referring generally to FIGS. 3 and 4, an alternative embodiment of a hybrid propulsion system that is operable to recover regenerative power during a high power braking operation of the vehicle is illustrated, and represented generally by reference numeral 50. The illustrated system 50 comprises auxiliary equipment 51, which can be powered either by the on-board power generation system 12 via the main DC link 16, or by regenerative braking power supplied by the motor 30 via the dynamic braking DC link 48.

In the illustrated embodiment, the auxiliary equipment receives power from an auxiliary DC link 52 through an inverter 53. A blocking diode 54 is provided between the main DC link 16 and the auxiliary DC link 52. Another blocking diode 56 is provided between the dynamic braking DC link 48 and the auxiliary DC link 52. During normal operation of the system 50, the voltage on the main DC link 16 forward biases the blocking diode 54. Current, represented by the arrow $I_4$, flows through the blocking diode 54 to the inverter 53 and on to the auxiliary electrical equipment 51.

Referring now to FIG. 4, during a high power braking operation, the dynamic braking of the motors 30 in the hybrid propulsion units 14 raises the voltage on the local DC links 28 above the voltage on the main DC link 16, which causes a flow of current, represented generally by arrow $I_5$, to flow through blocking diode 44 into the dynamic braking link 48. Because the back-emf generated by the traction motors 30 of the hybrid propulsion drives 14 is greater than the voltage on the main DC link 16, the blocking diode 56 coupling the dynamic braking link 48 to the auxiliary DC link 52 is forward biased. This enables power to flow to the auxiliary DC link 52 from the traction motors 30. From the auxiliary DC link 52, power flows to the auxiliary equipment 51. This also causes blocking diode 54 to be reverse biased, blocking power from flowing from the main DC link 16 to the auxiliary equipment 24.

In an alternative embodiment, one or more of the blocking diodes 40, 43 and 54 are replaced with one or more switches, which may be a contact of a relay or any other type of electrical flow control device. Such switches may be controlled to be non-conducting when it is desired not to have power flowing from the DC link 16 according to the corresponding blocking diode 40, 43 or 54 operating logic described earlier. In yet another embodiment, one or more of the blocking diodes 44, 45 and 56 are replaced with one or more switches, which are controlled to be non-conducting when it is desired not to have power flowing to the dynamic brake DC link 48 according to the corresponding blocking diode 44, 45 or 56 operating logic earlier. Using a switch may reduce conduction loss compared to using a diode in the same position.

Figure 5:
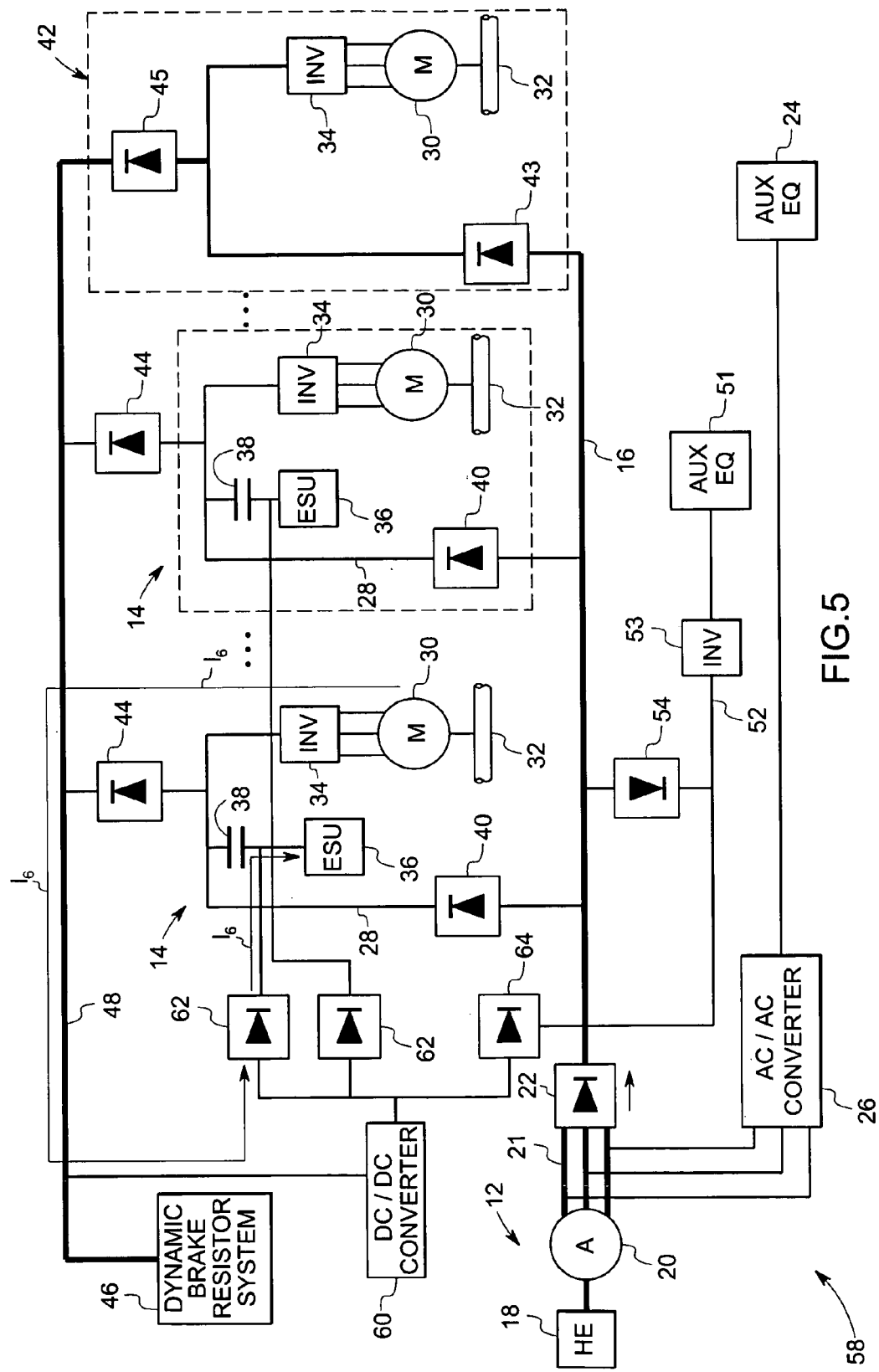
FIG. 5 is a schematic of a second alternative embodiment of a hybrid propulsion system, illustrating the charging of an energy storage unit by a traction motor during a high-power braking operation.

FIG. 5 illustrates a hybrid propulsion system 58 according to another alternative embodiment of the present techniques. The system 58 additionally comprises a DC/DC converter 60, which is used to couple regenerative barking power from the motor 30 to the energy storage unit 36 during a braking operation at a high power and generally high speed. The back emf produced by the traction motors 30 is greater when the motors 30 are braked at a higher power and higher speed than at a lower power and speed. At lower power levels and generally lower speeds, regenerative braking power from the electric motor 30 is coupled to the energy storage units 36 through the switch 38. However, during a high power braking operation, as illustrated earlier, the switches 38 are open. Hence regenerative power generated by the traction motors 30 is not suppliable through the switches 38 to charge the energy storage units 36. Instead, the regenerative power is directed through blocking diode 44 to the dynamic braking DC link 48. From the dynamic braking DC link 48, the current produced by the traction motors 30, represented generally by arrow $I_6$, is coupled the DC-DC converter 60. The DC/DC converter 60 is used generally to step-down the voltage of the dynamic braking DC link 48 to a voltage within an operable range of the energy storage unit 36. The output of the DC/DC converter 60 is directed to the energy storage units 36 through a blocking diode 62. A portion of an output of the DC/DC converter 60 may be directed to operate electrical auxiliary equipment 51 via a diode 64, through the auxiliary DC link 52 coupled to inverter 53.

The system 58 is advantageous because the DC/DC converter 60 may have a lower power rating than DC/DC converters used in conventional hybrid propulsion systems. In addition, the DC/DC converter 60 does not have to be bi-directional, i.e., the electric current flows in only one direction through the DC/DC converter 60, not two. Moreover, the DC/DC converter 60 is bypassed when the electric motor 30 is operated at lower power and generally lower speeds, thereby increasing the efficiency of the charging of the energy storage units 36.

Figure 6:
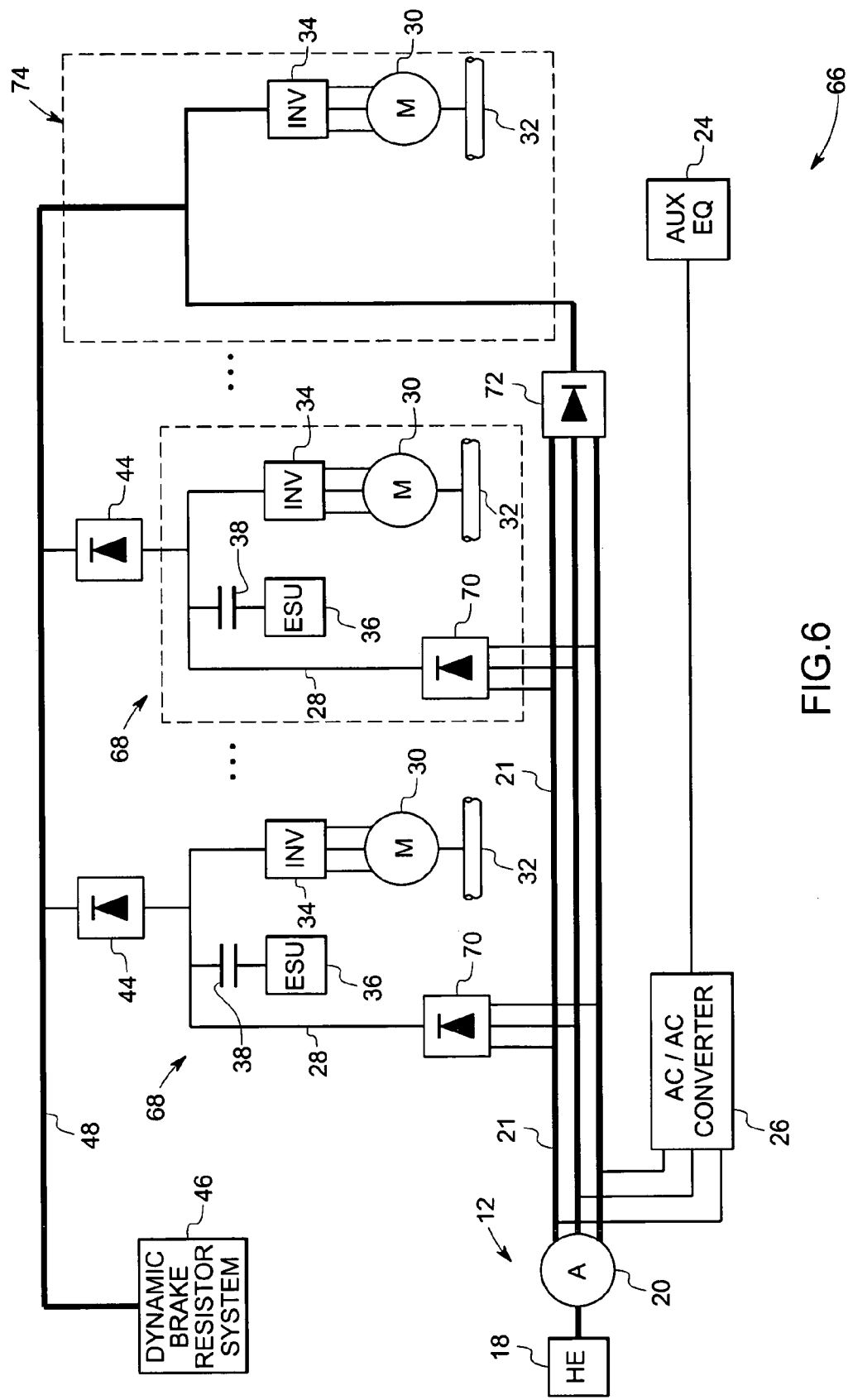
FIG. 6 is a schematic drawing of a third alternative embodiment of a hybrid propulsion system.

Referring generally to FIG. 6, an alternative embodiment of a propulsion system is illustrated, and referenced generally by reference numeral 66. In this embodiment, hybrid propulsion traction drives 68 are coupled directly to the AC link 21 via a rectifier 70. A rectifier 72 also is used to provide power to conventional propulsion traction drives 74. However, rectifier 72 is smaller than rectifier 22 of FIG. 1 because more than one rectifier is used to conduct electricity from the AC link 21 to the local DC link 28. In addition, rectifier 72 blocks current from re-circulating from one energy storage unit 36 to another during regeneration, without blocking diodes 43 and 45.

The present techniques thus provide recovery of regenerative braking energy across a wide range of vehicle power and speeds. In addition, the hardware utilized is simple and relatively inexpensive. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A propulsion system for a vehicle, comprising:
 a hybrid propulsion traction drive operable to power from an on-board power generation system, wherein the hybrid propulsion traction drive comprises:
 a main DC link coupled to the power generation system for receiving power generated by the power generation system;
 an electric motor operable to generate electrical power during dynamic braking;
 an energy storage unit; and
 a switch operable to electrically couple the energy storage unit to the electric motor to enable the energy storage unit to receive electrical power from the electric motor during dynamic braking of the electric motor from a first electric motor speed; and
 a direct current to direct current (DC/DC) converter operable to supply electrical power from the electrical motor to the energy storage unit during dynamic braking of the electric motor from a second electric motor speed, wherein the second electric motor speed is greater than the first electric motor speed and wherein the DC/DC converter receives power from the electric motor via a diode that is configured to enable electrical power to flow from the main DC link to a dynamic brake resistor system during braking.

2. The system as recited in claim 1, wherein the switch is closed during a first range of vehicle speed and is opened during a second range of vehicle speed vehicle, wherein the second range of vehicle speed is greater than the first range of vehicle speed.

3. The system as recited in claim 1, comprising the on-broad power generation system, wherein the on-broad power generation system is operable to supply power to a main DC link coupled to a plurality of hybrid propulsion traction drives.

4. The system as recited in claim 3, wherein each hybrid propulsion traction drive comprises:
 a local DC link electrically coupled to the electric motor, and;
 a first diode, wherein the diode enables electrical power to flow from the main DC link to the local DC link, and the diode blocks electrical power from flowing from the local DC link to the main DC link during dynamic braking of the electric motor.

5. A method of supplying power to an energy storage unit in a hybrid propulsion system for a vehicle, comprising:
 electrically coupling the energy storage unit to an electric motor via an electrical switch during operation of the electric motor at a first speed to enable electric power from the electric motor to flow to the energy storage unit during dynamic braking of the electric motor at the first speed; and
 electrically coupling the electric motor to the energy storage unit via a direct current to direct current (DC/DC) converter during operation of the electric motor at a second speed, the second speed being greater than the first speed, to enable electric power from the electric motor to flow to the energy storage unit during dynamic braking of the electric motor at the second speed, wherein the DC/DC converter receives power from the electric motor via a diode that is configured to enable electrical power flow from a main DC link to a dynamic brake resistor system during braking.

6. The method as recited in claim 5, further comprising opening the switch during operation of the electric motor at the second speed.

* * * * *